(12) United States Patent
Fisher et al.

(10) Patent No.: US 6,554,065 B2
(45) Date of Patent: *Apr. 29, 2003

(54) MEMORY GRAVEL PACK IMAGING APPARATUS AND METHOD

(75) Inventors: Kevin Fisher, Katy, TX (US); David Berneking, Houston, TX (US); J. Thomas Hampton, III, Houston, TX (US)

(73) Assignee: Core Laboratories, Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/447,393

(22) Filed: Nov. 22, 1999

(65) Prior Publication Data

US 2002/0060066 A1 May 23, 2002

Related U.S. Application Data

(60) Provisional application No. 60/126,561, filed on Mar. 26, 1999, and provisional application No. 60/162,040, filed on Oct. 28, 1999.

(51) Int. Cl.[7] .......................... E21B 47/10; E21B 47/12
(52) U.S. Cl. ........................ 166/253.1; 166/254.2; 166/250.02; 166/250.14; 166/278
(58) Field of Search .......................... 166/276, 278, 166/254.2, 250.08, 250.01, 253.1, 250.02, 250.14, 51

(56) References Cited

U.S. PATENT DOCUMENTS

| | | | | |
|---|---|---|---|---|
| 3,708,013 A | * | 1/1973 | Dismukes | 166/276 |
| 3,796,883 A | * | 3/1974 | Smith et al. | 250/260 |
| 4,181,014 A | * | 1/1980 | Zuvela et al. | 340/853.5 |
| 4,393,932 A | * | 7/1983 | Bodine | 166/249 |
| 4,423,323 A | * | 12/1983 | Ellis et al. | 250/264 |
| 4,656,354 A | * | 4/1987 | Randall | 250/256 |
| 4,691,772 A | * | 9/1987 | Ebenhack et al. | 166/254 |
| 4,783,995 A | * | 11/1988 | Michel et al. | 73/152.05 |
| 5,829,520 A | * | 11/1998 | Johnson | 166/250.01 |

OTHER PUBLICATIONS

S.S. Sollee; *Gravel–Pack Logging Experiments*, 60th Annual Technical Conference and Exhibition of the Society of Petroleum Engineers, Sep. 22–25, 1985, SPE 14163, pp. 1–10.

* cited by examiner

*Primary Examiner*—David Bagnell
*Assistant Examiner*—Jennifer H Gay
(74) *Attorney, Agent, or Firm*—Madan, Mossman & Sriram, P.C.

(57) ABSTRACT

The present invention provides apparatus and method for evaluating the integrity of gravel packing. A screen is disposed in an annulus between the wellbore and a production tubing. A tubing, such as a wash pipe, is placed inside the production tubing to provide a fluid path for the gravel slurry for gravel packing the screen. A self-contained memory logging nuclear tool is located in the tubing below (downhole) the screen. After gravel packing, the tubing with the tool is retrieved from the well at a selected speed. The tool is activated to record data in the memory carried by the tool as it passes across the screen. The data stored in the memory is downloaded at the surface to produce a log which provides a measure of the integrity of gravel packing of the screen.

19 Claims, 3 Drawing Sheets

MEMORY GRAVEL PACK IMAGING APPARATUS AND METHOD

This application is a non-provisional application based on provisional application No. 60/126,561, filed Mar. 26, 1999 and provisional application Serial No. 60/162,140 filed Oct. 28, 1999.

BACKGROUND OF THE INVENTION

1. Field of the Invention

This invention relates to well logging tools and methods, and more particularly to a memory logging tool for evaluating the degree of gravel packing.

2. Description of the Related Art

A vast array of tools are utilized to log oilfield wells during drilling and completion, and production phase of such wells. These logging tools obtain measurements relating to the drilling operation, wellbore condition and characteristics of the formation surrounding the wellbore. After drilling the wellbore to a desired depth, and before allowing it to produce hydrocarbons from a hydrocarbon-containing subsurface formation, the wellbore is made ready or "completed."

The completion operations usually include, among other things, lining the wellbore with a casing made of jointed metal tubulars, filling the annulus between the casing and the well with cement, installing sand screens, and perforating the casing and the formation at selected depths across from the hydrocarbon-containing strata to allow the hydrocarbons to flow from the formation to the wellbore. The formation fluid flows from the formation into the well via the perforations because the formation pressure is greater than the pressure in the well.

The free flow of the formation fluid into the well causes sand in the formation to flow into the well at relatively high flow rates, which can erode the tubular and other equipment in the wellbore. Such other equipment includes flow control valves, sensors, safety devices usually installed in the well to control fluid production through the well and for safety reasons.

One or more metallic screens, usually referred to as sand control screens, are placed in the wellbore to prevent inflow of formation solid particles (fines). Gravel is packed between the formation or casing and the production tubing to inhibit sand flow into the production tubing. Proper gravel packing is a critical step in the completion of a well.

Numerous gravel packing methods or procedures have been developed to inject sand or proppant into the annulus between the permeable screen and the production tubing in high permeability formations. As noted above, the annular sand pack performs the function of filtering formation solid particles which migrate into the well so that they cannot plug or limit production and to eliminate the erosion effects of the produced sand, which can damage the wellbore equipment, and in extreme cases cause the loss of the well. These procedures are referred to in the oil and gas industry as Gravel Pack, Frac Pack, Water Pack, etc., each of which is designed to provide essentially the same function—to completely and tightly fill the screen/casing annulus with sand or poppant with no voids or partially packed intervals. The gravel pack depth can range from a few (10) to several thousand (1000–5000) feet. The gravel pack acts as a filter that prevents the entry of formation fines into the wellbore without restricting the flow of the formation fluids. It is thus important to determine the integrity of the gravel pack. The success of the gravel pack and the longevity of the wellbore depends upon the extent and continuity of the gravel pack within the annulus.

The effectiveness of gravel placement in the screen-casing annulus or behind the casing (such as when prepacking perforation tunnels) is normally evaluated with treatment-pressure data. Darcy's law, volumetric calculations along with treatment pressure evaluation and pressure testing methods are used to estimate the level of gravel fill, with the minimum requirement being that the sand level must extend into the blank pipe above the top of the screen. This allows for the potential future settling of the sand. A direct measurement locating the top of the gravel pack and the quality or continuity of the sand fill within the annulus is preferred. Such measurements can be utilized to improve the above-noted treatment pressure data derived estimates. The continuity or absence of significant voids within the packed annulus is best evaluated with a direct measurement. Locating the voids soon after the completion is important because such voids can not normally be detected with the pressure evaluation methods. Voids can require workover of the gravel pack, and in extreme cases, can even lead to complete failure of the well.

At present, voids in the gravel-packed screen-casing annulus are usually evaluated from data from density, neutron, gamma-tracer or pulsed-neutron logs. These logs are usually obtained by wireline logging tools, which require a separate trip into the well and are often not performed promptly after finishing gravel packing. Also, when radioactive materials are used for evaluating proppant placement, gamma measurements are affected by the background signals produced by such radioactive materials. These background signals make the conventional density and pulsed-neutron silicon-activation methods relatively ineffective.

The present invention provides a high resolution, memory logging tool that directly evaluates the effectiveness of the gravel packing operation by measuring changes in the bulk density of the annular region of the gravel pack, wherein the measurements are not affected by the presence of radioactive tracers.

SUMMARY OF THE INVENTION

The present invention provides a system for determining the integrity of a gravel packing system by a memory logging tool. The gravel packing system includes a screen disposed in an annulus between the wellbore and a production tubing. A tubing, such as a wash pipe, disposed in the production tubing provides a fluid path from the surface to the screen. A fluid inflow port in the tubing provides a return fluid path from the screen to the tubing and to the surface. A memory logging tool carried by the washpipe is located in the tubing below (downhole) of the screen. Slurry containing gravel is pumped from the surface to the screen. The fluid returns to the surface via the in port. The tool includes a source of nuclear energy, gamma ray detector, a memory for storing data and a battery pack. Upon the completion of the gravel pack operations, the tubing with the memory logging tool is retrieved from the well at a selected speed. The tool is activated to record data as it passes across the screen. The data is stored in the memory, which is downloaded when the tool is retrieved at the surface to provide a log to determine the integrity of the gravel packing of the screen.

The tool may be operated in a continuous mode by activating the tool at the surface prior to deployment. Preferably, the tool is set at a sleep or inactive mode at the surface and activated upon the occurrence of a predefined condition. The tool may be activated when the wellbore pressure reaches or exceeds a predetermined threshold or by remotely activating it from surface or by providing a preset time delay, or by sensing the movement. The tool may include a plurality of collimated detectors, each obtaining data corresponding a particular gravel pack zone of interest.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended thereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

Figure 1:
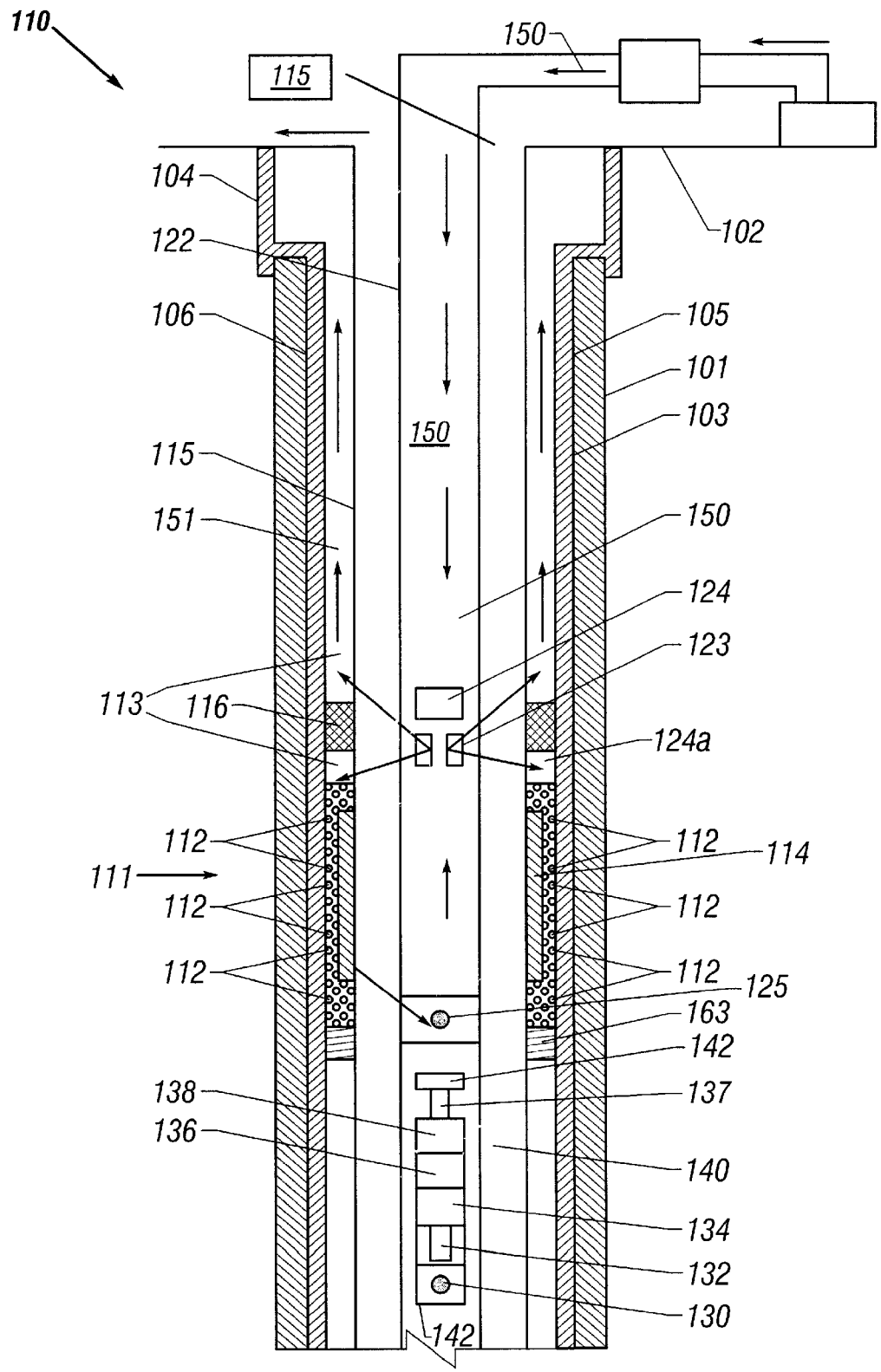
FIG. 1 is a schematic diagram, showing a memory-logging tool according to one embodiment of the invention disposed in a tubing during a gravel packing operation.

FIG. 1 shows a schematic diagram of the memory logging tool placed in a wellbore during an exemplary gravel packing operation. FIG. 1 shows a wellbore 101 formed from a surface location 102 to a desired depth. The wellbore 101 is lined with a casing 104 to a shallow depth from the surface. A wellbore liner or casing 106 is shown placed from the casing 104 along the length of the wellbore 101. Cement 103 is filled in the annulus 105 to set the liner 106 in the well to recover hydrocarbons from a subsurface hydrocarbon-containing formation or reservoir, such as reservoir 110. Perforations 112 are made through the liner 106 and into the formation 110 to allow the formation fluid to flow to the wellbore 101.

A production tubing 115 placed in the well acts as a conduit for the flow of hydrocarbons 111 to the surface 102. One or more screens, such as screen 114, are placed in the annulus 113 between the perforations 112 and the production tubing 115. A packer 116 is placed in the annulus between the casing 106 and the production tubing 11 5 above or uphole of the screen 114, which packer prevents the fluid flow through the annulus 113 above the packer 116. The screen 114, which is usually a metal screen, is packed with gravel to prevent flow of formation solids into the production tubing 115 and to reduce the velocity of the formation fluids entering the production tubing 115.

In one gravel pack method, a tubing, such as a wash pipe 122, is conveyed into a wellbore 101. A memory gamma ray tool 140 made according to the present invention is attached inside the tubing 122 at a depth 142 which can be below or downhole of the screen 114. The tubing 122 includes an outflow port 123 that allows fluid 150 pumped under pressure from the surface to flow to the screen 114. A valve 124 opens when the pipe 122 moves. The tubing 122 has a crossover tool (sliding sleeve) not shown, that allows the fluid 151 to flow from the screen 114 to the tubing 122, which is returned to the surface via passages (not shown) provided therefor.

Still referring to FIG. 1, the memory logging tool 140 includes a nuclear source 130, such as a gamma ray source or a neutron source to generate gamma rays or neutrons as the case may be into the borehole. The tool 140 includes one or more spaced apart gamma ray or neutron detectors 132, usually 6 to 24 inches apart. In the case of a gamma ray source, gamma rays are emitted from the source 130, which travel from the tool 140 to the screen 114 and into the annular space 113. The spacing between the source 130 and the scintillation detector(s) 132 is chosen so that the majority of the gamma rays are scattered within a defined annulus with minimal gamma rays penetrating the formation 110. The detectors 132 receive the scattered gamma rays and provide a corresponding count rate. In the above-described configuration, this count rate or volume is proportional to the amount of scattering to which the gamma rays are subjected in the defined annulus. The degree of scattering is a result of the concentration or the bulk density of the sand or proppant filling the annulus 113. The size of the gamma source 130 and detectors 132 are selected to produce a relatively large density count rate wherein most of the counts are due to the energy of the source 130 and a much smaller percentage of the counts are due to isotopes (if any) injected into the formation 110. This allows the use of the tool 140 to determine whether the annular pack is of sufficient concentration that will prevent sand flowback and whether the quality of the annular pack should be improved through an intervention technique. The tool 140 further includes detector electronics (electrical circuits and processors) 134 and a memory section 136. Power to the tool electronic section and memory section is provided by batteries in a battery section 138.

The detector 132 includes a detector such as a sodium iodide crystal and a photo-multiplier tube that converts the light signals (proportional to the received gamma rays by the crystal) to electric signals. The electronic section 134 processes these signals to determine the count rate and the energy level for such counts. The data generated by the electronic section 134 is stored in the memory 136 for downloading after the retrieval of the tool 140 to the surface.

To determine the effectiveness of the gravel pack operations, the tubing 122 with the associated equipment (not shown) and the memory logging tool 140 is located in the manner shown in FIG. 1, such that the memory tool 140 is located below the screen 114. Slurry 150 containing gravel or sand is pumped by a pump 160 from a source 162. The pipe movement opens the valve 124, thereby allowing the gravel slurry 150 to pass to the screen 114 via opening 124a. The gravel is packed in the screen 114 and the fluid 150 substantially without the gravel leaves the screen 114 and enters the tubing 122 via an inlet or inflow port 125. The fluid 151 returns to the surface 102.

The gravel continues to pack the screen 114, which process can take several hours. As the gravel packs, the pressure at the screen continues to increase. The gravel pack operator sets parameters at a predetermined pressure, above which it is presumed that the gravel packing has been accomplished and the process is stopped. In one embodiment, the memory logging tool 140 includes a pressure switch or pressure sensor 137 which is preset to a pressure threshold that is expected to be attained during the gravel packing operations. When this pressure threshold is exceeded, the tool 140 enters a wake-up mode, calibrates itself and becomes ready for the logging operation and starts to record data. Alternatively, a time delay may be provided before the tool 140 is activated to record data. The tool may also be set at the surface to continuously record the data or it may be remotely-activated from the surface by any suitable telemetry methods, including communicating control signals to the tool 140 in the well 101 by acoustic pulses, electromagnetic signals or pressure pulses. Accelerometer(s) may also be installed in the tool 140, which activate the tool 140 upon sensing tool movement due to the retrieval of the tubing 122 from the wellbore 101. In any event the tool 140 is activated to record data when the tubing 122 is retrieved from the well 101. When the tool is moved out of the well, the accelerometer sensor signals may be utilized to activate the tool.

At the conclusion of the gravel pack pipe operation, the tubing 122 is retrieved at a selected speed, thereby allowing the tool 140 to traverse the entire length of the gravel-packed section at such speed (the logging speed). The gamma ray log for the gravel-packed section is recorded in the memory 136 of the tool 140. Upon retrieval of the tool 140 from the well 101, the memory 136 is downloaded and a wellsite plot of count versus depth obtained, which provides the condition of the gravel pack and thus the effectiveness of the gravel pack operation and the integrity of the gravel-packed section. The logs may include count rate curves from one or more of the detectors 132 scaled such that high pack density and low pack density areas are relatively easily identified.

An important feature of the memory logging tool 140 is the ability to run the tool 140 on a variety of hoisting mechanisms because the tool 140 can be run on a coiled tubing, rope or chain, slickline, wireline or any other suitable conveying device. Conventional electric wireline, slickline or non-electric wireline, coiled tubing and actual work string or wash pipe (132) used in the gravel pack procedure can be utilized to deploy the memory logging tool 140 into and out of the wellbore 101. Because of the high cost of well intervention with the wireline tools, washpipe, such as 122 show in FIG. 1, is the preferred method of tool deployment. With this method, as noted above, the bottom of the tool 140 is placed inside the washpipe at or below the sump packer 163, which usually is the lower most seal between the screen 114 and the casing 106. The memory logging tool 140 with a finite amount of memory 136 and available battery packs can be put into a "sleep" mode whereby the major power consuming devices of the tool 140 are inactive during gravel pack operations, thus saving battery power. The tool 140 does not record substantial amounts of data during the sleep mode, thus preserving memory for the actual logging trip out of the wellbore 101.

An additional benefit of the present invention is that the washpipe tool transport mode requires no additional rig time as is required by wireline trips. Rig time costs offshore can run tens of thousands to hundreds of thousands of dollars per day. As noted above, the present tool may also be operated in other modes, including initializing the tool logging mode with a programed time delay, with an accelerometer which uses tool movement due to retrieval of the tool 140 from the well 101 to activate the tool. The tool may be operated continuously during trip into and out of the wellbore.

Figure 2:
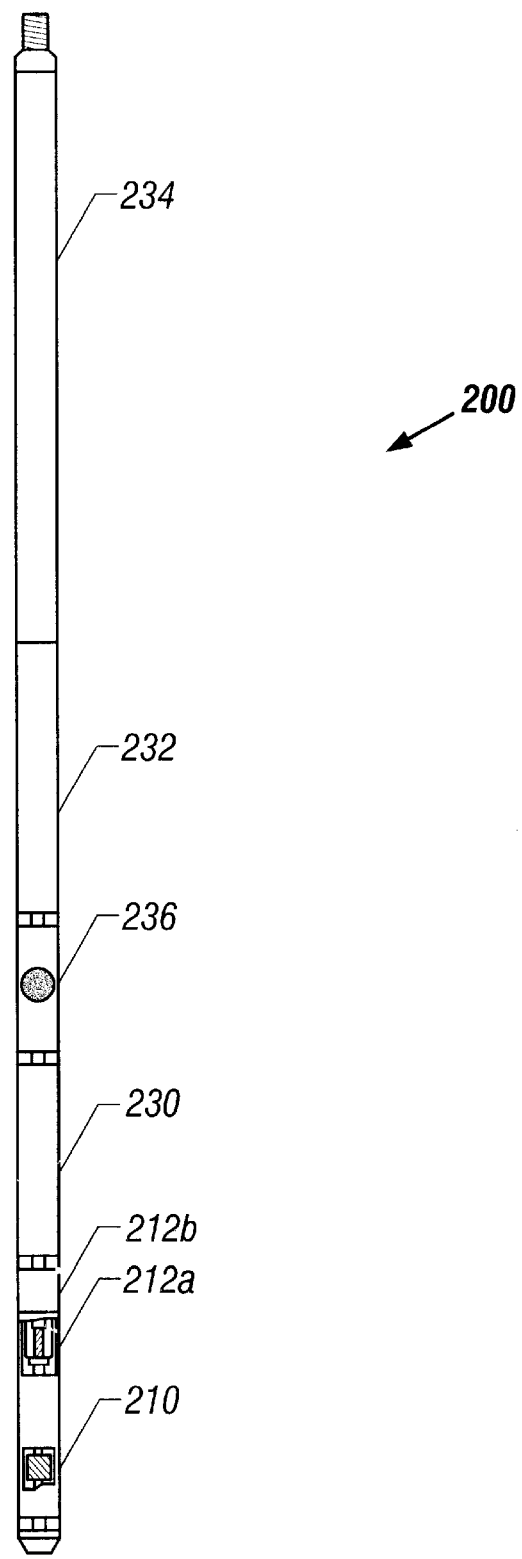
FIG. 2 shows a schematic diagram of a memory logging tool utilizing a plurality of collimated detectors according to an alternative embodiment of the present invention.

FIG. 2 shows an alternative embodiment 200 of the memory logging tool of the present invention. The tool 200 includes a gamma ray source 210 and a plurality of collimated spaced-apart detectors. FIG. 2 shows two such spaced-apart detectors 212a and 212b. Each such detector may be arranged on the tool to evaluate a proportional degree of the circumference of the sand control screen. The tool 200 also includes a microprocessor-based control circuit 230, a memory module 232 and a battery pack 234. A pressure switch 236 may be provided to activate the tool as described above. Other activation methods, as described above in reference to FIG. 1, may also be utilized.

The tool 200 can be azimuthally oriented such that the degree and location of any imperfections or voids in the gravel pack can be detected. The tool 200 may include two or more collimated detectors with an orientation package referencing one of the detectors to the high side of the tool in the wellbore. This is especially useful in horizontal or deviated wells, thus, any imperfections or voids sensed by the detectors can be located with reference to the high or low side of the wellbore and can be quantified as a percent of the circumference of the packed or unpacked areas.

Figure 3:
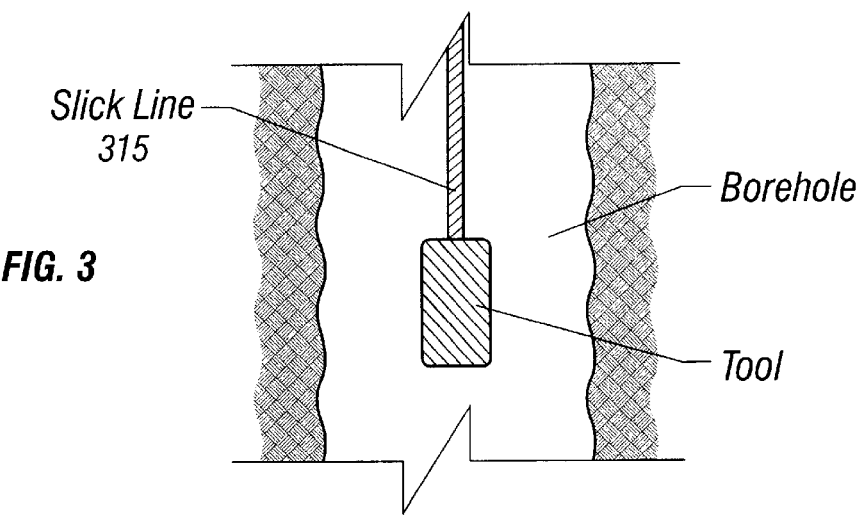
FIG. 3 shows the present invention deployed on a slick-line.
Figure 4:
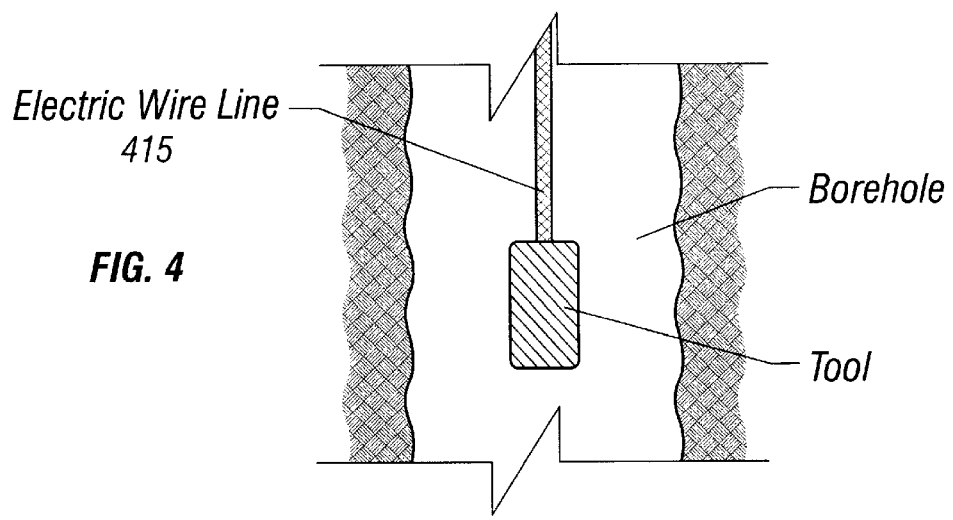
FIG. 4 shows the present invention deployed on an electric wireline.
Figure 5:
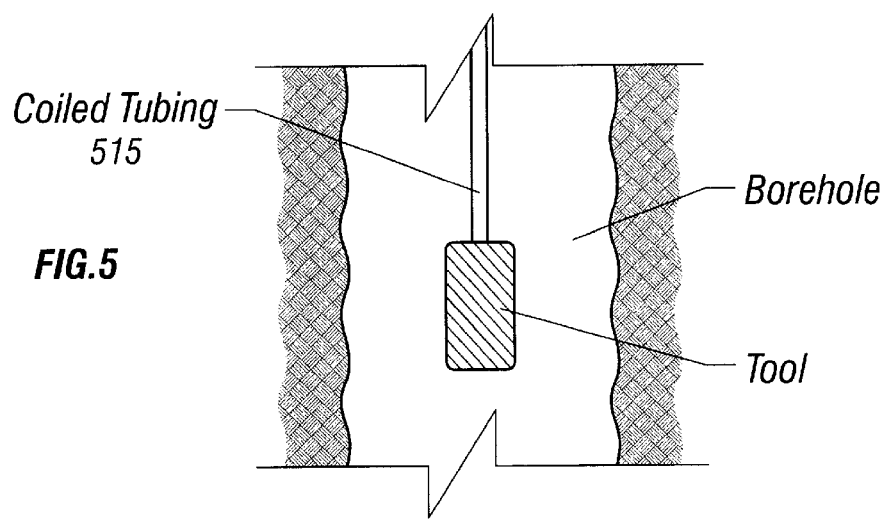
FIG. 5 shows the present invention deployed on a coiled tubing.

FIG. 3 shows the present invention deployed on a slickline 315;

FIG. 4 shows the present invention deployed on an electric wireline 415;

FIG. 5 shows the present invention deployed on a coiled tubing 515.

Thus, the present invention provides a self-contained, self-powered memory logging tool for evaluating the integrity of gravel pack in a wellbore annulus, wherein the tool is placed below the annulus to be gravel packed prior to gravel packing the annulus and the tool is retrieved subsequent to gravel packing to record logging data in the tool memory, which data is downloaded at the surface to obtain a log for determining the integrity of the gravel pack.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of evaluating degree of gravel pack in a predefined annulus between a tubing and well bore inside, comprising:

providing a down hole tool at an end of a conveying member, said tool adapted to record data in a memory in said tool corresponding to nuclear energy generated by a source and received by at least one (1) scintillation detector carried by said tool in response to said nuclear energy generated by said source thereof in said annulus, wherein the size of said source and scintillation detector are chosen to produce a relatively large density count rate wherein the counts are substantially due to the energy of the source and a much smaller percentage of the counts are due to radioactive materials injected into the formation;

injecting radioactive materials into a formation;

locating said down hole tool at a predetermined location in said well bore;

packing said annulus with gravel;

detecting the azimuthal orientation of the detector in the down hole tool with respect to an orientation package in the tool;

locating imperfections with reference to the detector with respect to the high or low side of the well bore;

quantifying imperfections in a gravel pack as a percent of a circumference of a packed or unpacked areas; and recording said data in said memory while moving said tool along said annulus by said conveying member.

2. The method of claim 1 wherein said source and said at least one scintillation detector are spaced apart so that the majority of gamma rays are scattered within a defined annulus with minimal gamma rays penetrating an adjacent formation.

3. The method of claim 1, wherein providing said downhole tool further includes providing a battery pack in said tool, thereby a self-contained memory logging tool wherein data is stored in tool memory and retrieved from tool memory after retrieving the tool from the well bore.

4. The method of claim 1, wherein said conveying member includes selecting said member from a group consisting of a (i) wash pipe; (ii) slickline; (iii) electric wireline; and (iv) coiled-tubing.

5. The method of claim 1 further including setting the tool to an inactive sleep mode at the surface and activating said tool after locating the tool in said wellbore to start recording said data, thereby reducing data recorded by the tool.

6. The method of claim 5, wherein activating said tool is performed upon one (1) of (i) sensing a pressure exceeding a limit: (ii) sensing a pressure threshold; (iii) sending a signal via a remote control: (iv) sensing movement of said tool in said well bore using an accelerometer: (v) a programmable time delay: or (vi) running the tool in a continuous acquisition mode.

7. The method of claim 5 further comprising:

deploying a screen between the well bore and tubing; and opening a valve to allow pumped gravel slurry to pass to the screen to form the gravel pack.

8. The method of claim 1, wherein said at least one (1) detector includes a plurality of collimated spaced apart detectors each detector corresponding to a particular gravel pack zone of interest.

9. The method of claim 1 further comprising:

determining orientation of the detector in the tool.

10. The method of claim 1, further comprising:

referencing the detector to a high side of the tool in the well bore.

11. The method of claim 1, further comprising:

injecting radioactive materials into the formation.

12. A memory logging and packing tool adapted to be placed below a well bore annulus to be gravel packed prior to gravel packing of said annulus comprising:

a nuclear source for generating nuclear energy in said annulus;

at least one (1) detector for detecting nuclear energy scattered by said annulus in response to said nuclear energy generated by said source wherein the size of said source and a scintillation detector are chosen to produce a relatively large density count rate wherein the counts are substantially due to the energy of the source injected into the formation and a much smaller percentage of the counts are due to radioactive materials injected into the formation;

an azimuthal position detector for detecting the azimuthal position of the down hole tool in order to detect the degree and location of imperfections or voids detected in the gravel pack;

a memory in the tool for storing data representative of said nuclear energy detected by said at least one (I) detector; and wherein said tool is further adapted to log said annulus while retrieving said tool from the well bore to the surface after gravel packing the annulus.

13. The tool according to claim 12 wherein said source and said at least one scintillation detector are spaced apart so that the majority of gamma rays are scattered within a defined annulus with minimal gamma rays penetrating an adjacent formation.

14. The tool according to claim 13, wherein said at least one (1) detector includes a plurality of collimated spaced apart detectors each detector corresponding to a particular gravel pack zone of interest.

15. The tool according to claim 13 further including a device for setting the tool to a sleep mode at the surface activating the tool to initiate data collection in the wellbore during retrieval of said tool from the well bore, thereby reducing data recorded by the tool.

16. The tool according to claim 13, wherein said device is selected from a group consisting of (i) a pressure switch; (ii) a pressure sensor; (iii) a remotely-activated device; (iv) an accelerometer; (v) a programmable time delay; and (vi) in a continuous recording mode.

17. The apparatus of claim 16 further comprising:

a screen positioned between the well bore and tubing; and a valve to allow pumped gravel slurry to pass to the screen to form the gravel pack.

18. The tool of claim 12, further comprising:

an orientation package referencing the detector to a high side of the tool in the well bore.

19. The tool of claim 12, further comprising:

an injector for injecting radioactive materials into the formation.

\* \* \* \* \*